Aug. 28, 1956 M. HORNSTEINER 2,760,415

SUCTION-OPERATED DEVICES FOR PICKING UP FLAT FOLDING BOXES FROM A PILE

Filed April 18, 1951 9 Sheets-Sheet 1

INVENTOR:
MAXIMILIAN HORNSTEINER
BY Richardson, David and Nordon
his ATTY'S

Aug. 28, 1956 M. HORNSTEINER 2,760,415

SUCTION-OPERATED DEVICES FOR PICKING UP FLAT FOLDING BOXES FROM A PILE

Filed April 18, 1951 9 Sheets-Sheet 2

INVENTOR:
MAXIMILIAN HORNSTEINER
BY
Richardson, David and Nordon
ATTY'S.

Aug. 28, 1956

M. HORNSTEINER 2,760,415

SUCTION-OPERATED DEVICES FOR PICKING UP FLAT FOLDING BOXES FROM A PILE

Filed April 18, 1951

9 Sheets-Sheet 3

INVENTOR:
MAXIMILIAN HORNSTEINER
By
Richardson, David and Norden
His ATTYS.

INVENTOR:
MAXIMILIAN HORNSTEINER
By Richardson, David and Nordon
His Atty's.

INVENTOR:
MAXIMILIAN HORNSTEINER
BY Richardson, David and Nordon
his ATTYS.

Aug. 28, 1956 M. HORNSTEINER 2,760,415

SUCTION-OPERATED DEVICES FOR PICKING UP FLAT FOLDING BOXES FROM A PILE

Filed April 18, 1951 9 Sheets-Sheet 6

INVENTOR:
MAXIMILIAN HORNSTEINER
BY
Richardson, David and Nordon
his ATTYS

INVENTOR:
MAXIMILIAN HORNSTEINER
BY Richardson, David and Nordon
his ATTYS

INVENTOR:
MAXIMILIAN HORNSTEINER
By Richardson, David and Nordon
his Attys

INVENTOR:
MAXIMILIAN HORNSTEINER
By Richardson, David and Nordon
his ATTYS.

United States Patent Office 2,760,415

Patented Aug. 28, 1956

2,760,415

SUCTION-OPERATED DEVICES FOR PICKING UP FLAT FOLDING BOXES FROM A PILE

Maximilian Hornsteiner, Stuttgart-Munster, Germany

Application April 18, 1951, Serial No. 221,598

Claims priority, application Germany April 29, 1950

16 Claims. (Cl. 93—53)

This invention relates to improvements in the manufacture of folding boxes and has special reference to suction-operated devices for picking up flat folding boxes from the pile and folding over the picked-up folding boxes, breaking the edges thereof which are still unbroken, and feeding the folding boxes thus folded over to a conveyer device, for instance, a travelling conveyer belt.

In known devices of this kind operating with reciprocating suction members, the speed of operation, and hence the productive efficiency of the device is inherently limited by this reciprocating motion.

It is an object of the present invention to provide a device of the type referred to adapted to obtain a high efficiency.

With this object in view, according to the invention the reciprocating motion of the suction members is replaced by a movement around a closed loop-shaped path.

According to an important feature of the invention, the suction nozzle of the suction member is moved on a course defined by a closed curve shaped in such a way that the said nozzle at the beginning of the curve or of a branch of the curve is moved, for a short time, into a position of engagement with the foremost box of a supply of folded boxes piled in a supply hopper, thereby sucking on a folding box at one side thereof, and that the nozzle during the further course of its travel opens the box by cooperation with appropriate stop members and guide means acting upon the other side of the suctionally held folding box and recloses it in a position opposite to its original position, approximately at the point of culmination of the curve.

Other and further objects, features and advantages of the invention will be pointed out hereinafter and appear in the appended claims forming a part hereof.

In the accompanying drawings, several preferred embodiments of the invention are shown by way of illustration and not by way of limitation.

Figure 1:
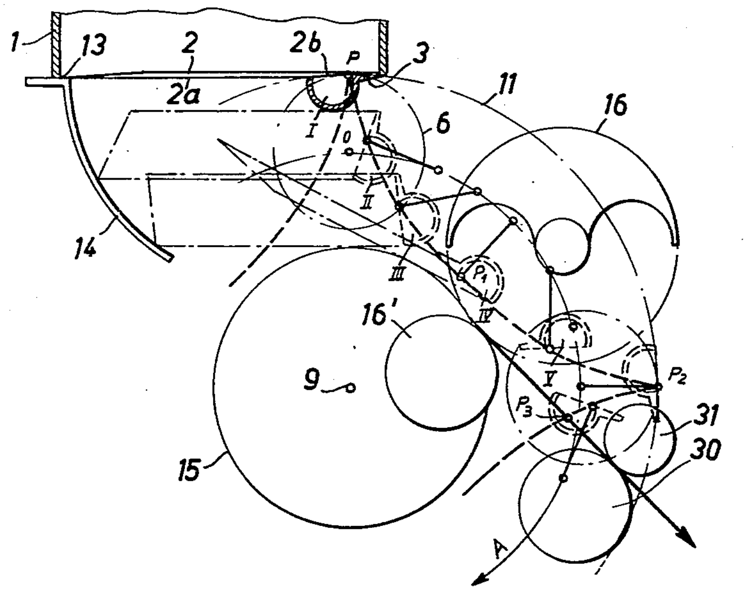
Figure 2:
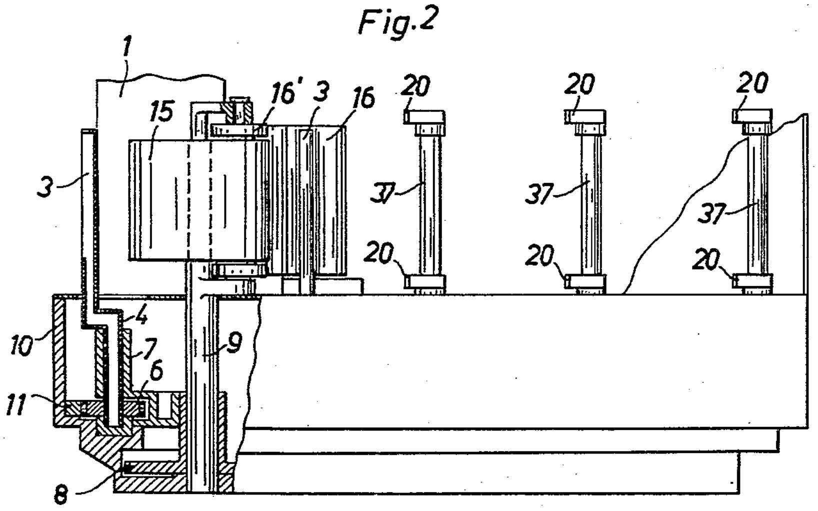
Figure 3:
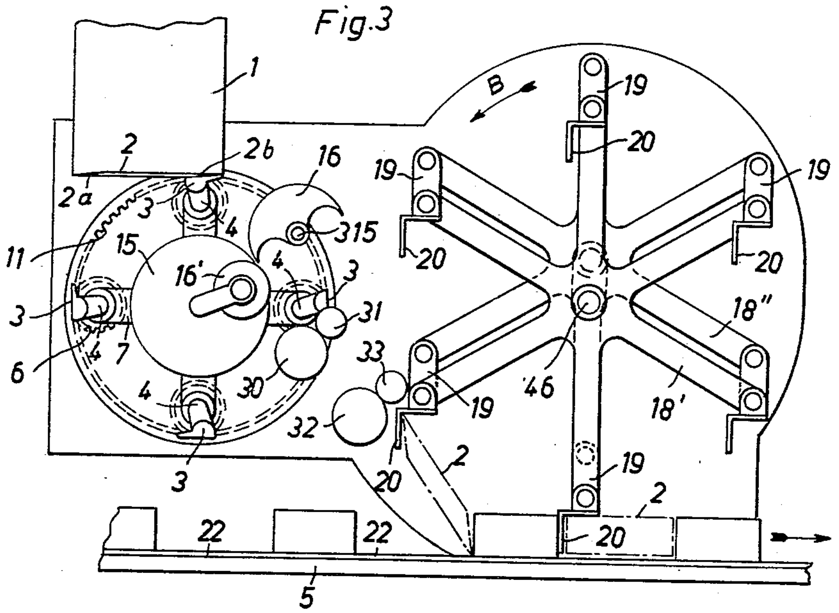
Figure 5:
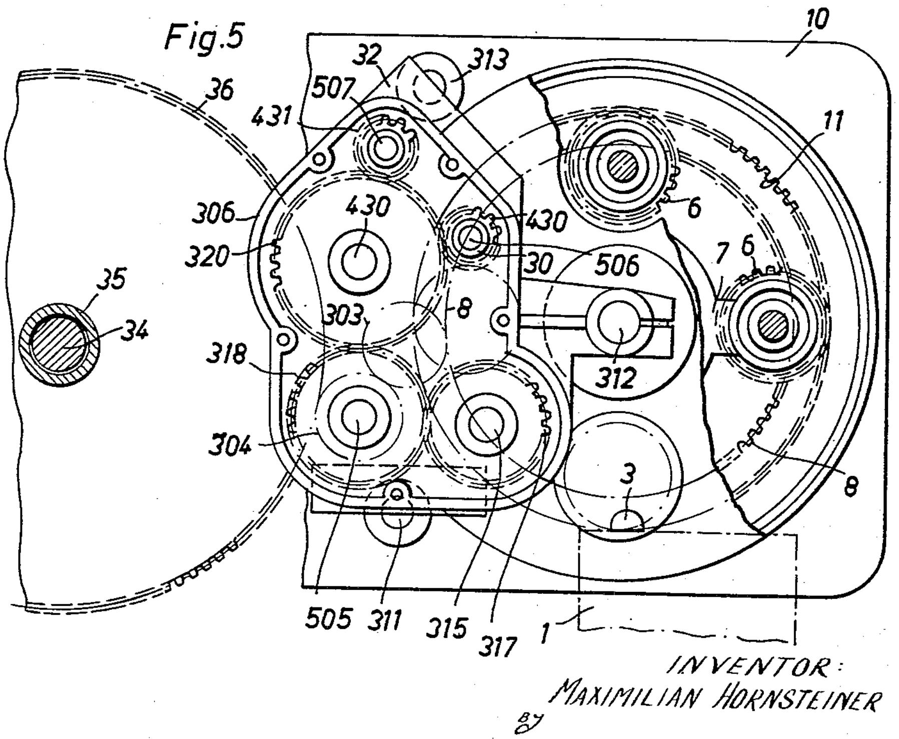
Figures 6, 7:
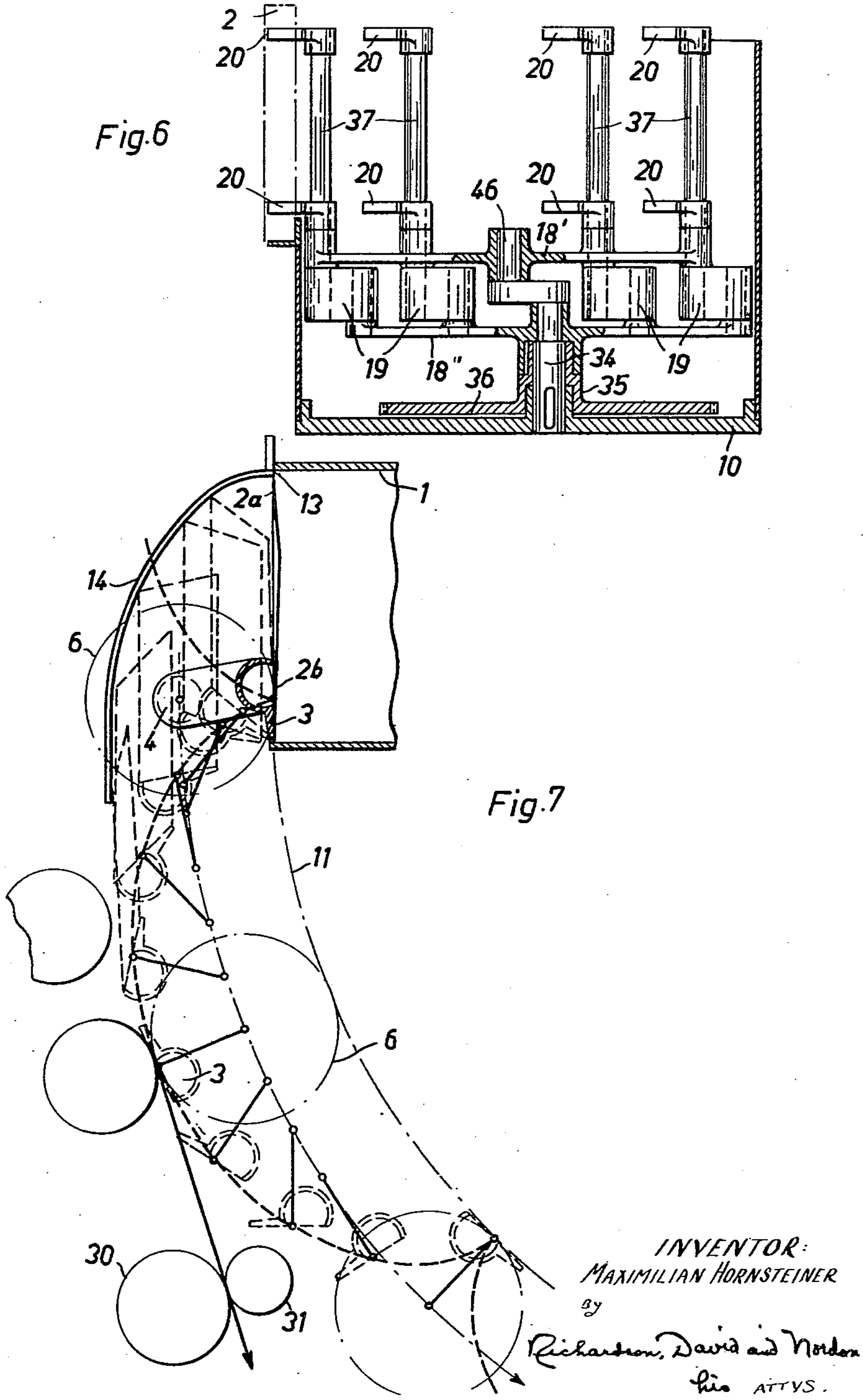
Figure 4:
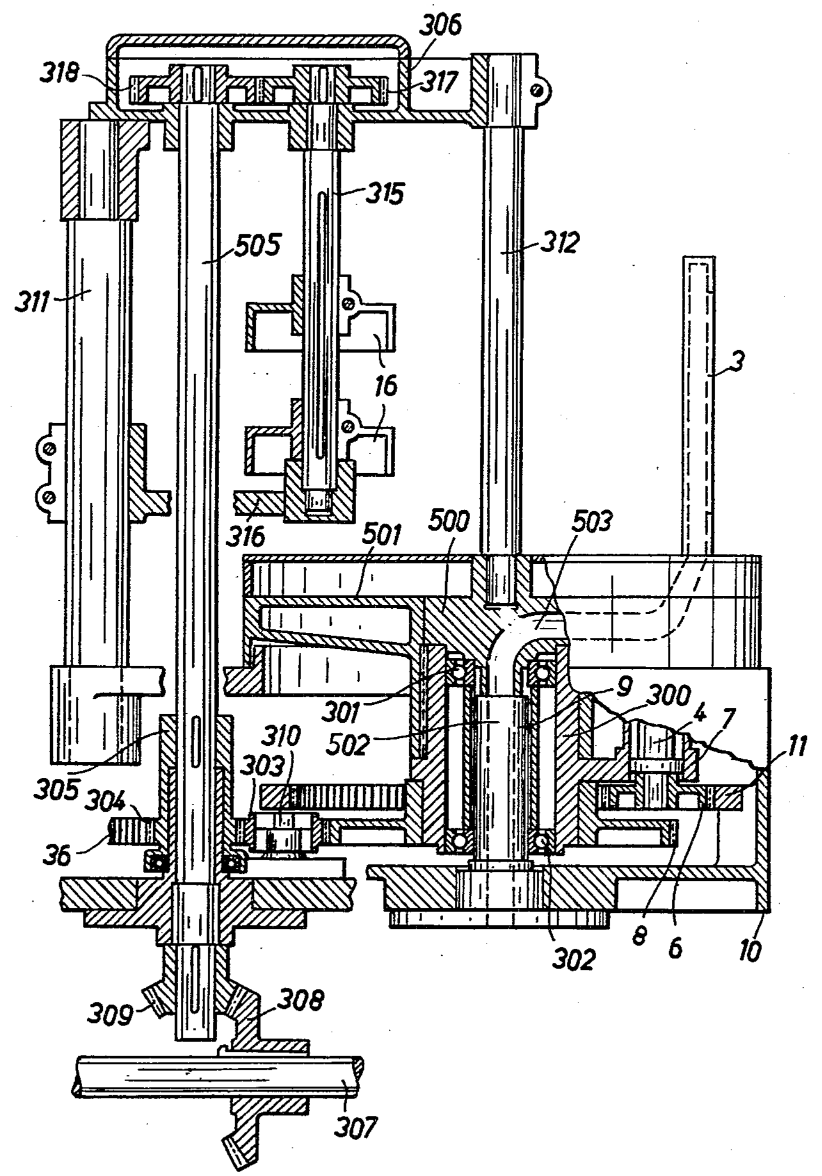
Figure 8:
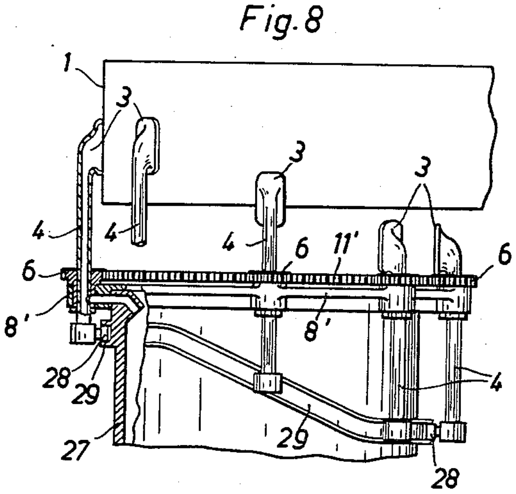
Figure 9:
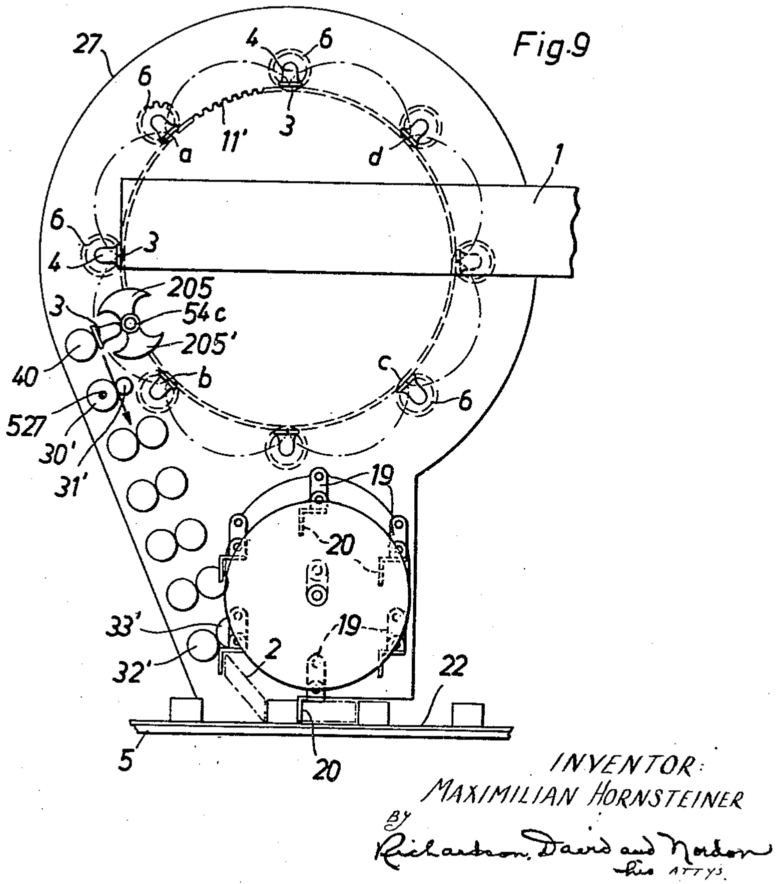
Figure 10:
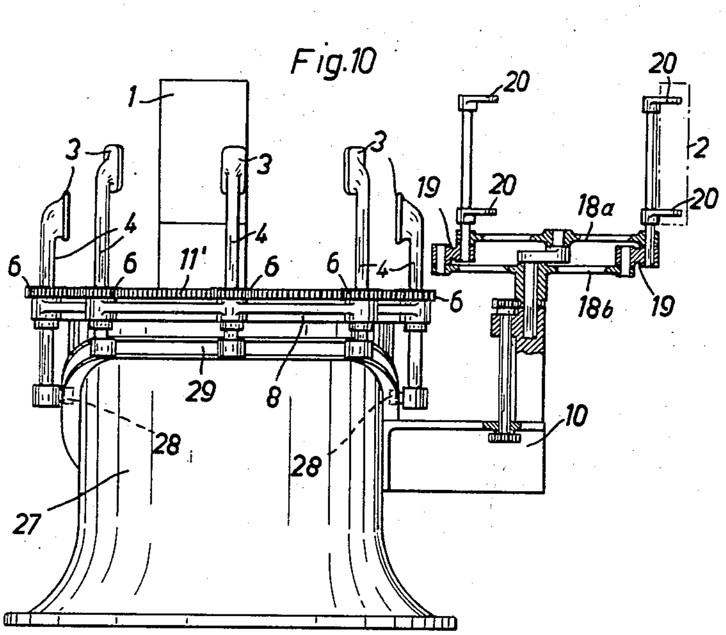
Figure 11:
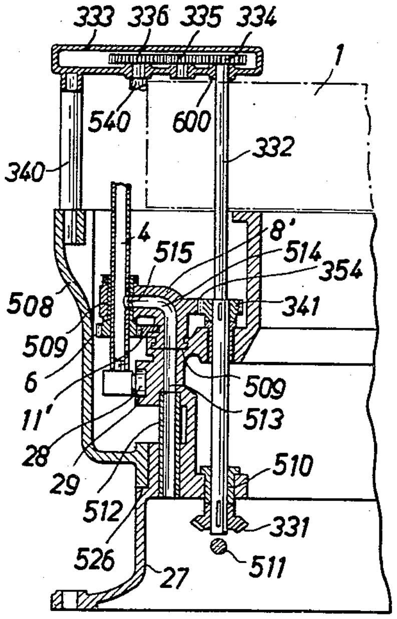
Figure 12:
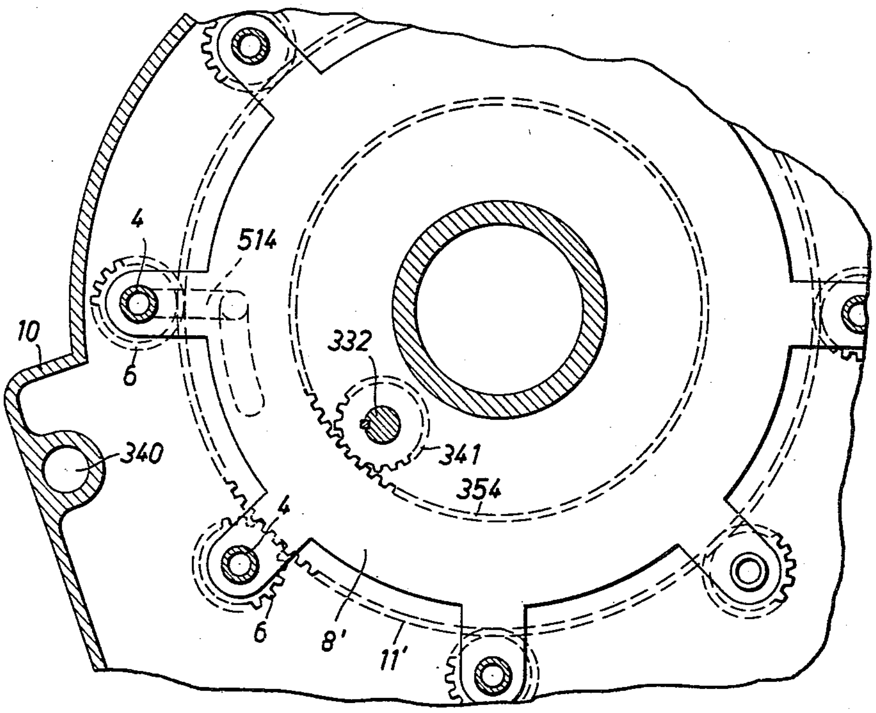
Figure 13:
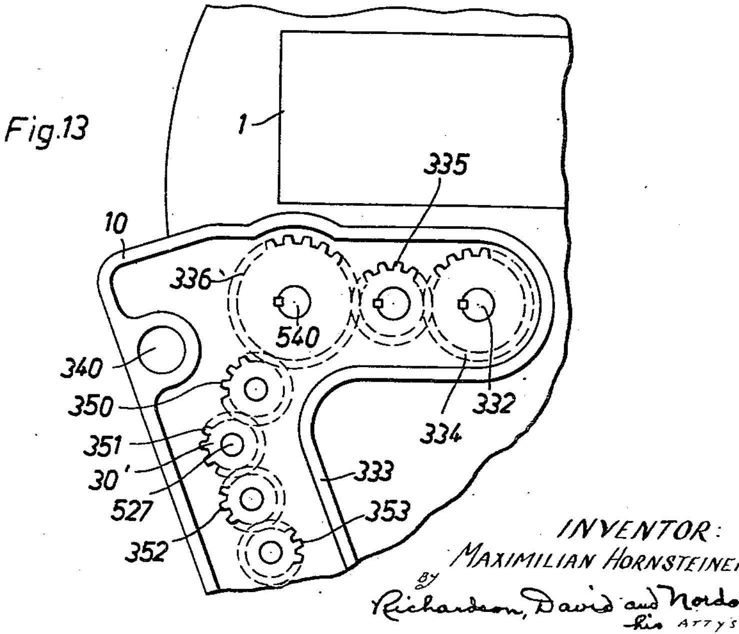
Figure 14:
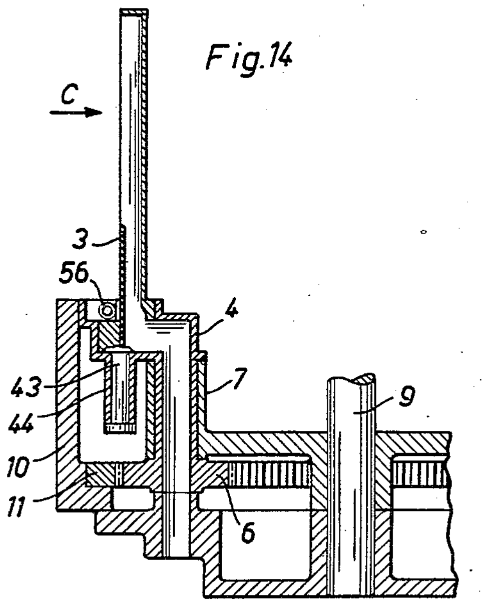
Figure 15:
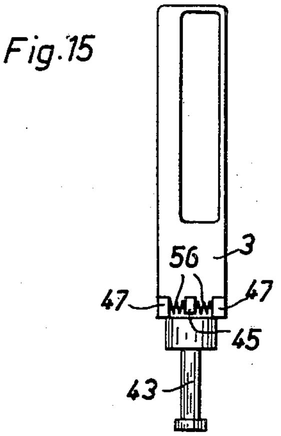
Figures 16, 17:
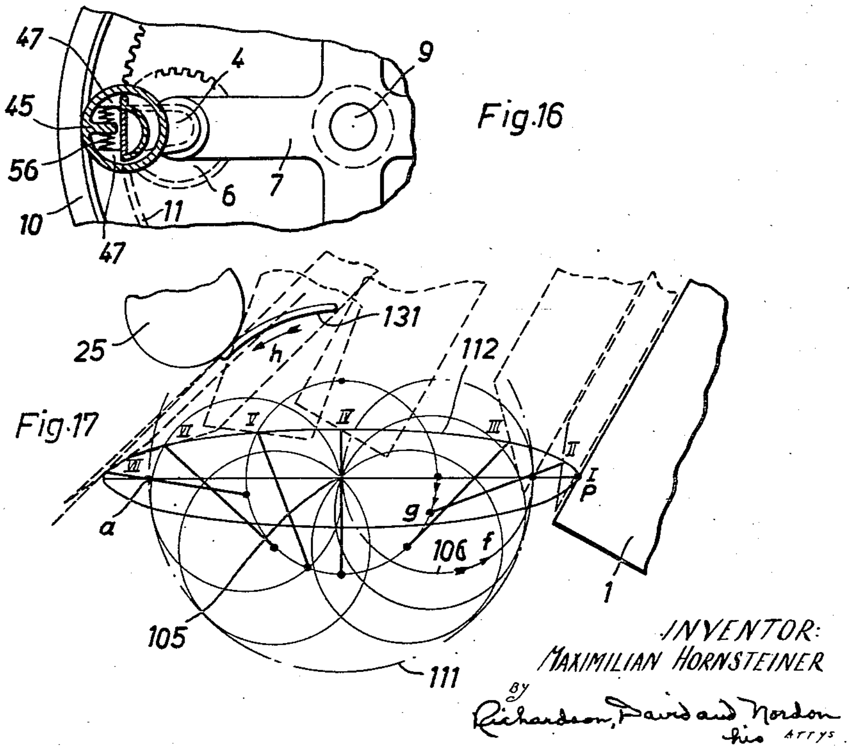
Figures 18, 19:
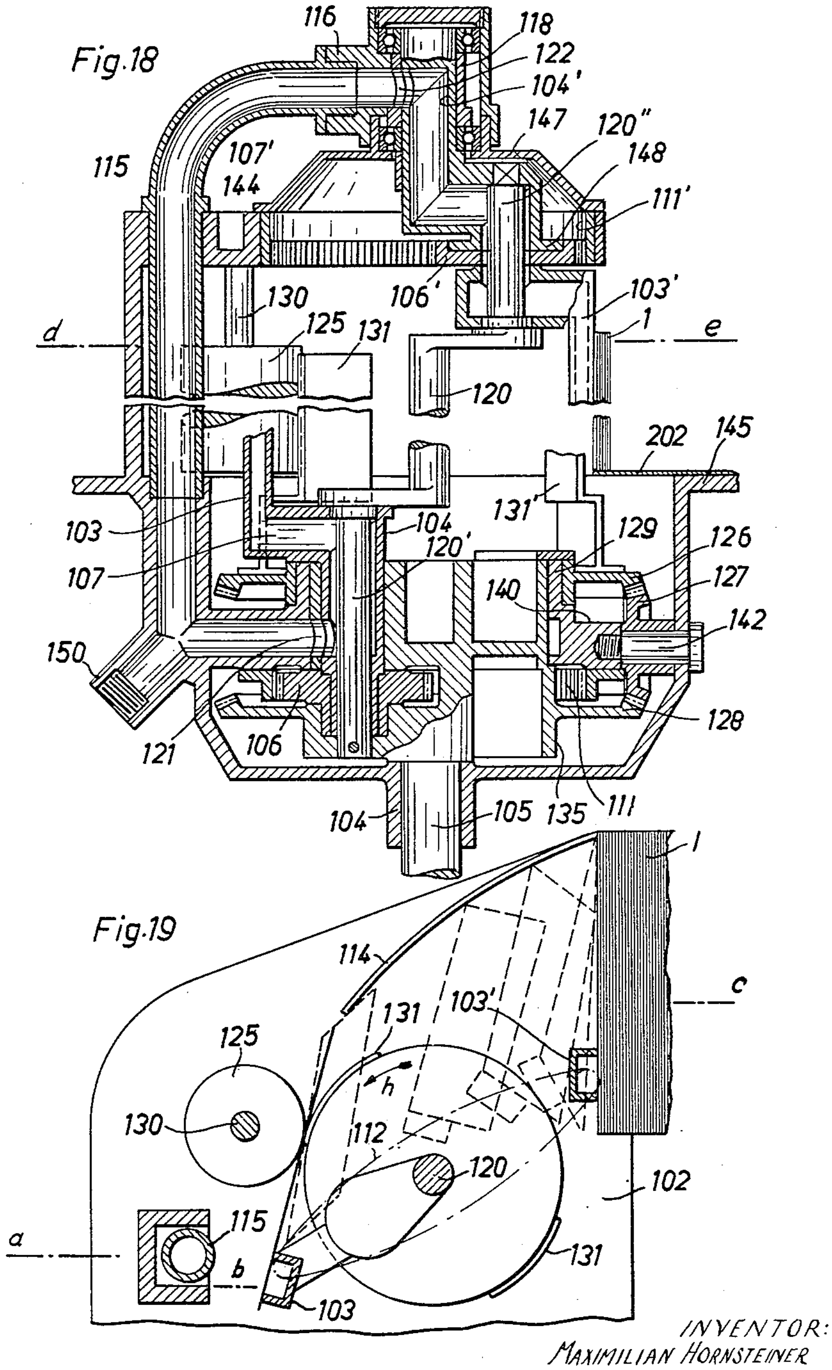

Fig. 1 is a diagrammatic view showing the course of a suction member according to one embodiment of the invention, basing on a hypocycloid curve, Fig. 2 is a side view thereof, partly in section, Fig. 3 is a plan view of Fig. 2, Fig. 4 is a side view on a larger scale, partly in section, of a part of the embodiment of Fig. 2, Fig. 5 is a plan view of the gear for parts shown in Fig. 3, Fig. 6 is a side view, partly in section, of a part of Fig. 2, Fig. 7 is a diagrammatic view of the path of a suction tool of another embodiment based on the use of an epicycloid curve, Fig. 8 is a side view, partly in section, of this embodiment, Fig. 9 is a plan view thereof, Fig. 10 is a side view, partly in section, viewed from the left of Fig. 9, Fig. 11 is a vertical section, on a larger scale, through a part of Fig. 8, with some modifications, Fig. 12 is a plan view thereof, partly in section, Fig. 13 is a plan view of a part of the gear of the embodiment as per Fig. 9, Fig. 14 is a vertical section, on a larger scale, through a part of the device including the suction tool and its drive, Fig. 15 is a side view of the suction tool, viewed in the direction of arrow C of Fig. 14, Fig. 16 is a plan view of Fig. 14, Fig. 17 is a diagrammatic view illustrating the course of the suction tool of an embodiment based on the use of an elliptic path, Fig. 18 is a vertical section thereof, on the line *a—b—c* of Fig. 19, and Fig. 19 is a plan view of the device, viewed on the line *d—e* of Fig. 18.

Similar reference numerals denote similar parts in the different views. The pile is denoted 1, the folding box is denoted 2, its broad side is denoted **2*a* and its narrow side is denoted 2*b***.

The collapsed folding boxes 2 are individually taken from the pile 1 by a device comprising a suction tube 4 having a suction nozzle 3 operating on the narrow side **2*b*** of the respective foremost folding box.

In the embodiment shown in Figs. 1 to 6, the suction tube 4, as shown in detail in Figs. 4 and 5, is rotatably mounted in a lateral arm 7 of a sleeve 300, and a toothed wheel 6 is fixedly mounted on the lower end of the tube 4, said toothed wheel 6 meshing with an internally toothed rim 11 fixedly secured in a casing 10.

The sleeve 300 is rotatably mounted by means of ball bearings 301 and 302, on a shaft 9 and in a stationary insert 500 of the cover 501 of the casing 10. The shaft 9 is fastened on the bottom of the casing 10 in any suitable and known manner. The bore 502 of shaft 9 is connected through a bore 503 of the stationary insert 500 on the one hand with a conventional and well known source of vacuum and on the other hand with the suction tube 4 of the suction tool 3, in a manner similar to that illustrated in Fig. 11. Secured on the sleeve 300 is a toothed wheel 8 which is driven through an intermediate wheel 303 by a toothed wheel 304 of a sleeve 305. The sleeve 305 is fastened on a vertical shaft 505 mounted at its lower end in a suitable bearing of the bottom of the casing and at its upper end in a suitable bearing of casing 306 and being permanently rotated by the main driving shaft 307 through a pair of bevel gears 308, 309, so that the toothed wheel 8 with the sleeve 300 and the suction tube 4 also rotates continuously. The spur wheel 303 is mounted on a shaft 310 secured to the bottom of the casing 10. The casing 318 is connected with the casing 10 by means of three columns 311, 312, and 313.

In the position of the parts as shown in Fig. 1, the suction face of the suction nozzle 3 is disposed accurately above the point of engagement P of the pitch circles of the toothed wheel 6 and toothed rim 11. By rotation of arm 7 in the direction of arrow A of Fig. 1, the point P will describe a pure hypocycloid and move via $P_1$ to $P_2$, where it is again accurately above the point of engagement of the two pitch circles of toothed wheel 6 and toothed rim 11. The distance O—P of the suction surface from the center of rotation of wheel 6 is equal to its radius, and the suction surface successively takes up the positions I, II, III, IV etc. in Fig. 1. In the position P, the suction action is switched on, i. e. the suction nozzle is connected to a source of negative pressure, whereby the suction surface of the suction nozzle 3 engages with and carries along the narrow side **2*b* of the folding box 2. The end of the broad side 2*a*** of the folding box is at first guided by a projecting ledge 13 at the wall of the pile and in the further course of the rotation of the toothed wheel 6 is guided on a curved sheet 14 of such a shape that the folding box 2 is gradually opened and in the further course of the operation is collapsed towards the opposite side, as indicated in Fig. 1 by the various positions of the folding box as illustrated.

In the culmination point $P_1$ of the hypocycloid, the suction nozzle 3 faces the center of the gear wheel 8. At this point, a roller 15 is loosely rotatably mounted on the column 312 concentrically to the toothed wheel 8. In this position, the suction nozzle 3 has reached its maximum speed which is approximately twice the speed of the suction tube 4. Therefore, the folding box will also have this speed when the suction effect of the suction member 4 is now turned off. By the suction nozzle 3 the folding box which is reversed in relation to its original position in the pile 1, is urged onto the shell of the roller 15. Opposed to this roller 15 is a half-roller 16, which performs one revolution during one suction period and in cooperation with the roller 15 advances the folding box, so that the same leaves the path of the trailing suction tool, which is crossed by the folding box, before the suction tool reaches the crossing point $P_3$. The half-roller 16 is secured on a shaft 315 which is mounted at its lower end in an arm 316 of the column 311 and at its upper end in the bottom of the casing 306, a toothed wheel 317 fastened on shaft 315 and meshing with a toothed wheel 318 fixedly mounted on the shaft 505 serving to turn shaft 315. In its position indicated by point $P_2$ the suction nozzle, just as at the beginning of the suction in point P, has zero speed. The next branch of the hypocycloid begins at this point. If desired, a plurality of suction tools may be arranged in the closed hypocycloid path, i. e., the smaller the size of the folding box to be worked, the more suction tools may be used. It is not necessary that there be a suction tool acting in each branch of the hypocycloid curve.

In order to convey the folding box 2 now folded up in an opposite direction, by breaking the edges so far unbroken, there are provided in this embodiment, as shown in Fig. 3, further pairs of rollers 30, 31 and 32, 33, by which the folding box supplied by the rollers 16 and 16′ is fed to a travelling belt 5 or another suitable conveying means.

Conveying devices of the type of the conveyer belt 5 are well known in the art as to their design, drive, and mode of application and, therefore, do not require a more detailed description. The rollers 31 and 33 are loosely mounted in known manner while the rollers 30 and 32 are driven. According to Figs. 4 and 5, the rollers 30 and 32 are driven by toothed wheels 430 and 431 fixedly mounted on the shafts 506 and 507 of the rollers 30 and 32, and driven by a toothed wheel 320 which in its turn is driven by the toothed wheel 318. The belt 5 is provided in known manner with cases or pocket-like feeding receptacles 22 corresponding in cross-section to the cross-section of the erected box. The belt 5 cooperates with a double reel consisting of an upper reel 18′ and a lower reel 18″ and mounted according to Fig. 4 on a pin 34 suitably secured in the casing 10 and being designed like a crank, in such a way that the center axes of the two reels 18′ and 18″ are relatively staggered according to the crank pin. The lower reel 18″ is secured on the hub of a toothed wheel 36 permanently revolving during operation of the device and being driven by a spur wheel 304, Fig. 5. The upper reel 18′ is rotatably mounted on the crank pin 46, and the corresponding ends of the two reels which are of the same size, are linked together by links 19 having vertically adjustable angle bars 20 which on rotation of the double reel in the direction of the arrow B indicated in Fig. 3 embrace the folding box 2 leaving the pair of rollers 32, 33, and introduce the same into the belt 5 in such a manner that at first the foremost edge of the folding box engages the front wall of the respective box 22 and assumes its speed. The rear edge of the box 2 still partly open is advanced with acceleration by the double reel 18′, 18″, in such a manner that all corners of the folding box have the same speed, i. e., that of the belt 5, in the moment where the respective arm of the reel comes to lie perpendicularly to the travelling direction of the belt 5. To this end, the number and size of the arms of the reel is dimensioned so that the product of the effective arm length and the sine of the angle formed between one arm of the reel and the perpendicular line on belt 5 is only slightly smaller than the respective travelling distance of the belt. This small play is required for permitting the introduction of folding boxes of unequal thickness of paper. In the present instance, four arms 7 with suction tools 4 are arranged on the toothed wheel 8 for successive action, whereby the angular velocity of the wheel 8 is only one quarter of the driving speed, so that the bearings can be designed accordingly.

One embodiment of the invention, based on an epicycloid path of the suction nozzle 3, will now at first be described in a general way with reference to the diagrammatic Figures 7 to 10. The pile 1 in this case is mounted on a standard 27. The toothed wheel 6 of each suction tool 4 according to Fig. 7 meshes with an externally toothed rim 11′ secured around the upper part of the standard 27. The suction tubes are rotatable in suitable bearing eyes of a wheel 8′ which in turn is mounted for rotation about the standard 27 and on operation of the device is set in rotation, so that the toothed wheel 6 of the suction tool rolls on the stationary toothed rim 11′. The nozzle tube 4 is vertically slidable, but not rotatable, in the toothed wheel 6. Arranged at the lower end of each suction tool 4, by means of a block 100, is a roller 28 permanently facing the standard 27 and engaging in a groove 29 of the standard 27. Thus, the suction tool 4 is forced to take up predetermined heights in predetermined positions in relation to the pile 1.

When the suction tool is in the quadrant *a—b* (Fig. 7) in front of the pile 1, i. e., in the position for picking up the foremost folding box, the part of the groove 29 corresponding to the quadrant *a—b* is horizontally disposed, and the suction tool is operated as if the same would be rotatable in a plane. After the suction tube has been turned through 180°, so that its suction nozzle 3 faces outwards, it will force the folding box against a revolving roller 40. A roller consisting of two diametrically opposed shell parts 205 and 205′ is arranged opposite to roller 40 and revolves in such a way that its shell parts 205 and 205′ embrace the suction tool and, on advancement of the suction tool, force the folding box against the roller 40. However, when the folding box has been passed on to the feed rollers 40, the groove 29 is declining, i. e., approximately in the succeeding quadrant *b—c*, in order that the suction tool in the third quadrant *c—d* of its track, which quadrant is again horizontal, is enabled to pass below the pile 1 to the fourth quadrant *d—a*, which again rises up to the quadrant *a—b* of the track.

An exemplification of this construction is shown in Figs. 11 to 13. In this case, the drive for the suction tool as distinguished from the diagrammatic representation of Figs. 6 to 10, is surrounded by a cover 508 supported on a shoulder 526 of the casing 27. Similar reference numerals have been used to denote similar parts in the two embodiments. Just as in the embodiment as per Figs. 7 to 10, the toothed wheel 6 of each suction tool, in which the suction tube 4 is mounted to be vertically slidable but non-rotatable, meshes with a toothed rim 11′ secured around the upper part of the standard 27. The sleeve-shaped hub of each toothed wheel 6 is rotatable in a bearing of a wheel 8' which in its turn is rotatably mounted on the upper end of the standard at 509 and is set in rotation on operation of the device, so that the toothed wheel 6 rolls on the stationary toothed rim 11'. The revolving motion is imparted to the toothed wheel 8' by engagement of its toothing 354 in a spur wheel 341 secured on the vertical shaft 332. The shaft 332 is mounted at its lower end in a bearing 510 of the casing 27 and at its upper end in a bearing 600 and is permanently rotated by the main driving shaft 511, i. e., in known manner by means of a bevel wheel (not shown) secured on the shaft 511 and meshing with a bevel wheel 331 fixedly mounted on the lower end of the shaft 332. The suction tube 4 is connected to a source of vacuum (not shown) of well-known type through a duct formed by a pipe 512, a bore 513 of the standard 27, a bore 514 of the toothed wheel 8', and an opening 515 in the suction tube 4.

The cylinder or roller 205, 205' (Fig. 9) consisting of two diametrically opposed shell parts 205 and 205' is driven by a spur wheel 334 secured within the casing 333 on the upper end of shaft 332. The casing 333 is secured on the shell-type top part of casing 27, in a similar manner as described above with reference to the casing 306, by means of three columns, one of which is shown at 340. The toothed wheel 336, secured on the shaft 540 of the roller 205, 205', is driven by the toothed wheel 334, through the intermediate wheel 335.

The roller 40 (Fig. 9) is mounted so as to be loosely rotatable. The pairs of rollers acting to feed the folding boxes from the rollers 205, 205', and 40 to the reel device 19, 22 are arranged as shown in Fig. 9, the first pair of rollers being denoted 30', 31' and the last pair of rollers being denoted 32', 33', respectively. The rollers 31' . . . 33' are mounted so as to be loosely rotatable. The first roller 30' is driven by the spur wheel 351 through the spur wheels 350 and 336. The wheel 351 is secured on the shaft 527 of the roller 30', Fig. 13. The further rollers 31' including the last roller 32' are rotated by spur wheels 351, 352, 353 etc. secured on the shaft of these rollers.

The two aforedescribed arrangements basing on the use of an epicycloid path of the suction nozzle 3 also permit the provision of several suction tools which according to the scheme of Fig. 5 are moved according to epicycloids, in such a way that the suction tool in its points of reversal always comes to lie inside the path and therefore need not cross the path of the folding box to be delivered.

A further advantage of these embodiments resides in the fact that the delivery speed can be made smaller than in case of a hypocycloid path.

If desired, the path of the suction tool may also be formed by the simultaneous application of hypocycloid and epicycloid curves.

In order to permit the suction nozzle 3, in the moment of the sucking on and picking up of the folding box from the pile, to carry out its curved motion without being hampered, i. e., even if the contact surface of the folding box is not accurately parallel to the suction surface, the suction nozzle 3 according to the exemplification of Figs. 9 to 11 is adapted to be swung about a vertical axis. To this end, the suction nozzle 3 is pivotally mounted, by means of a pin 43, in a bearing 44 of the suction tube 4 so as to be swingable through a limited angle. This may be effected, for instance, by means of a partition wall 45 clamped between two helical springs 56 whose opposite ends lie against noses 47 of the suction nozzle 3.

In the embodiment as per Figs. 17 to 19, the pile 1 of the folding boxes is supported on a plate 202 of the pot-shaped frame 145 which is provided with a branch 150 for connection to the suction pipe. Mounted in the bearing 204 of the frame is the driving shaft 105 which is adapted to rotate permanently during operation of the machine and is formed with a cylindrical part 135. Rotatably mounted in an eccentric bore of the cylinder 135 is the suction tube 104 of a suction tool 103. The suction tube 104 is connected with a spur wheel 106 whose pitch circle radius corresponds to the eccentricity of the suction tool 103. The toothed wheel 106 meshes with the internal toothing of a toothed rim 111 fastened under an intermediate bottom wall 140 of the frame 145. The mutual ratio of the pitch circles of spur wheel 106 and toothed rim 111 is 1:2. On rotation of the driving shaft 105, the toothed wheel 106 rolls on the stationary toothed rim 111. The rolling gear 106 is rotating on a path *f* oppositely to the direction *g* of the rotation of the suction tube about the driving shaft 105, Fig. 12. During the rolling motion, a point of the pitch circle of wheel 106 describes a straight line A—P passing through the center of the toothed rim 111. A point *p* disposed outside of the pitch circle of the rolling wheel 106 on the contrary describes a quasi-hypocycloidic path 112. The pile 1 of flat folding boxes is arranged in such a way in relation to the elliptic path 112 that the nozzle of the suction tool 103 seizes the narrow side of the folding box actually to be picked up, in a point where the movement approaches the point of reversal of the path of the suction nozzle, i. e., where the speed is nearly zero (point of reversal of the quasi-hypocycloidic path).

In the course of the path described by the suction surface of the suction nozzle, the same takes up positions I, II—VII, Fig. 12. During this motion, the folding box is opened by a guide plate 114 guiding the edge of the box facing away from the suction nozzle, and then caused again to assume a closed position resulting in a turning over of the folding of the folding box. At the end of the operative path of the suction member (approximately after half a turn of the suction tube about the driving shaft 105) the folding box is again completely closed. Now the sucking action of the suction tool is turned off and the box is delivered to a conveying device of any conventional and known design (not shown) by which the box is passed to the next station.

In the present instance, a roller 125 is rotatably mounted by means of a shaft 130, parallel to the driving shaft 105, in the frame 145 and in an upper bridge member 144. The folding box delivered by the suction tool on completion of the opening operation engages the roller 125 which in the further course of the movement of the suction tool assists the reclosing of the box. On turning off of the suction effect of the suction tool, the roller 125 together with a hollow cylinder comprising two shell parts 131 and 131' and rotating in the direction of arrow *h*, Fig. 14, i. e., in an opposite sense of the driving shaft 105, serves to feed the inversely closed folding box to a conveying device of conventional type (not shown), for instance a pair of conveying rollers, by which it is passed to the next station. The large cut-outs between the shell parts 131 and 131' serve to provide sufficient space for the two extreme positions of the suction nozzle during the picking up and during the delivery of the folding box.

The rotary movement of the hollow cylinder 131, 131' is derived from the motion of the crank arm 107 connecting the suction tube 104 and the suction tool 103, i. e., through a bevel wheel 128 connected therewith, a bevel wheel 126 of equal size on which the cylinder 131, 131' is secured, and an intermediate bevel wheel 127. The bevel wheel 126 is mounted on a stepped upper annular flange or collar 129 of the intermediate wall 140. The intermediate bevel wheel 122 is mounted on a pin 142 which is seated on the one side in the pot 145 and on the other side in the intermediate wall 140 radially to the driving shaft 105.

As far as the general arrangement is concerned, the front face of the pile 1 of folding boxes is preferably arranged to form an angle, advantageously of about 120°, with the main axis of the quasi-hypocycloidic path described by the suction surface of the suction nozzle. In this manner, the suction tool is given sufficient time to suck on the narrow side of the folding box, and during the opening movement of the folding box with the aid of the guide plate 114 favorable conditions are created for the edge of the folding box which is remote from the suction tool and during the delivery of the inversely reclosed box to the feeding device serving for conveying the said box.

For better utilization of the path of the ellipse it is preferred to arrange a second suction tool 103' operating in the same way as the suction tool 103 and being disposed diametrically to the suction tool 103. In order to permit the two suction tools 103, 103' to pass each other in the small axis of the ellipse, the drive of the second suction tool 103' is arranged above the drive for the suction tool 103 in the bridge 144 which is connected with the pot-shaped frame 145 by one or more supports. The suction tube 115 for the upper suction tool is accommodated in one of these supports. Connected to the upper horizontally bent-off end of the suction tube is a hollow knee piece 116 bearing a downwardly open pot 147 in which is secured the internally toothed rim 111'. Accommodated in the cylindrical part of the knee piece 147 is the bearing 118 for the hollow shaft 104' of the crank pin 107' on the plate 148 of which the spur wheel 106' for the second suction tool is rotatable. The spur wheel 106' bears the suction tool 103' which is downwardly directed parallelly to the driving shaft 105.

In order to avoid the provision of a separately rotating special drive for the toothed wheel 106', a crank shaft 120 is arranged between the two suction tools 103 and 103', the pins 120' and 120'' of this crank shaft passing through the hollow crank pins 107 and 107' of the suction tools 103 and 103' and being fixedly connected thereto. In this manner, the rotary motion of the driving shaft 105 is transmitted to the two rolling wheels 106 and 106'. The pins 120', 120'' of the crank shaft 120 are relatively staggered by 180° so that the two suction tools are always in opposite positions and operate in such a way that one of the suction tools is picking up a folding box while the other suction tool simultaneously delivers a folding box.

The control for the suction air is arranged closely underneath the suction tools at 121 and 122.

While the invention has been described in detail with respect to certain now preferred examples and embodiments of the invention, it will be understood by those skilled in the art after understanding the invention that various changes and modifications may be made without departing from the spirit and scope of the invention and it is intended, therefore, to cover all such changes and modifications in the appended claims.

What is claimed is:

1. A device of the class described, comprising: a supply hopper for feeding collapsed cartons; at least one suction tube including a suction nozzle adapted to engage the foremost carton, and withdraw the same from said supply hopper; guide means for the carton withdrawn; a first conveying means including pressing means; a pair of similar reels having arms with different axes of rotation, said axes and the corresponding ends of said arms being spaced apart; link means interconnecting the corresponding ends of said reel arms; a second conveying means including pocket-like feeding receptacles; at least one gripping means carried by said link means, said gripping means being carried into the path of travel of said second conveying means during the course of rotation of said reel arms; and means for moving each suction nozzle along a path forming a closed cycloidal curve, the configuration of said path causing said nozzle at the beginning of its travel to engage the foremost carton of said supply hopper, whereby said carton is held at one side thereof, opened and inversely recollapsed in cooperation with said guide means, transmitted to and pressed by said first conveying means, and fed by said first conveying means to said gripping means, said gripping means reopening said carton and introducing it into a feeding receptacle of said second conveying means.

2. A device according to claim 1 in which the path of travel of said second conveying means is generally rectilinear in that portion thereof where said gripping means is carried into said path, said pocket-like receptacles each including a forward wall, and in which said gripping means includes a member of L-shaped cross-sectional configuration, one leg of said L being maintained substantially parallel to said forward walls by said link means during rotation of said reel arms, said reopening of said carton taking place as one side thereof is positioned for engagement with said L-shaped member and an opposite side thereof is positioned for engagement with one of said forward walls, the side engaged by said L-shaped member being accelerated as the reel arms with which said L-shaped member is associated by said link means progressively assume a direction perpendicular to said path of travel of said second conveyor means, the spacing between said L-shaped member and said forward wall being substantially equal to and slightly greater than the distance between said opposite sides of said carton when said carton is fully reopened, said reopening being completed at the time when said reel arm is in said perpendicular position, the velocity of said L-shaped member at said time being substantially vectorially equal to the velocity of said second conveyor means.

3. A device of the class described, comprising in combination: supply means for feeding flat collapsed cartons arranged in a stack; a continuously rotating carrier member having its axis of rotation parallel to the planes of said cartons; a fixed gear coaxial with said carrier member; a planetary gear carried by said carrier member and meshing with said fixed gear; a suction tool revolubly carried by said carrier member and connected to said planetary gear to be driven thereby, said suction tool having an active suction face extending parallel to said carrier member axis and disposed at least closely to a position in alignment with the pitch circle of said planetary gear, said suction face being arranged to become momentarily effectively linearly stationary at a first position adjacent to an edge portion of the foremost carton in said stack for engagement therewith and to travel in a path of generally cycloidal character from said first position to a second position, said tool having suction continuously applied thereto during its travel from said first position to said second position for conveying said engaged carton therebetween; guide means having a continuous curved surface cooperating with said engaged carton during at least a portion of its travel from said first position to said second position, said guide means causing said engaged carton to open and to become at least partially recollapsed in the direction opposite to the direction in which it was collapsed while it was disposed in said stack; and forwarding means disposed to engage said oppositely collapsed carton at said second position and convey it onwardly therefrom in completely oppositely collapsed condition.

4. A device according to claim 3 wherein the portion of said suction tool comprising said suction face is independently rotatable about its own longitudinal axis, said device further comprising resilient means yieldingly acting on said independently rotatable portion of said tool and urging said suction face toward a rotational position for engagement with said foremost carton at said first position.

5. A device according to claim 3 in which said forwarding means comprises a partial cylindrical surface driven in timed relationship with respect to said carrier member and a roller member disposed for intermittent cooperation with said partial cylindrical surface to seize and convey onwardly said oppositely collapsed carton therebetween.

6. A device according to claim 3 further comprising reopening means disposed to receive moving recollapsed cartons from said forwarding means, said reopening means comprising continuously operative means for receiving and erecting said moving recollapsed cartons prior to further onward conveyance thereof.

7. A device according to claim 3, wherein said curved surface of said guide means is curved about an axis parallel to said rotational axis of said carrier member and said surface extends from a position adjacent to an edge portion of said foremost carton in said stack remote from said edge portion thereof engaged by said suction face to a position which permits said engaged carton to be engaged by said forwarding means.

8. A device of the class described, comprising in combination: supply means for feeding flat collapsed cartons arranged in a stack; a continuously rotating carrier member having its axis of rotation parallel to the planes of said cartons; a fixed internally toothed ring gear coaxial with said carrier member; a planetary gear carried by said carrier member and meshing with said ring gear; a hollow crank shaped suction tool having the end of one leg coaxially connected to said planetary gear for rotation therewith and having the other leg arranged to provide an active suction face extending parallel to said carrier axis and in alignment with the pitch circle of said planetary gear, said suction face being arranged to become momentarily linearly stationary at a first position adjacent to an edge portion of the foremost carton in said stack for engagement therewith and to travel continuously in a hypocycloidal path from said first position to a second position at which said suction face has a considerable linear component in its velocity, said tool having suction continuously applied thereto during its travel from said first position to said second position for conveying said engaged carton therebetween; curved guide means cooperating with the edge portion of said engaged carton remote from said suction face during a first portion of its travel from said first position to said second position, said guide means causing said engaged carton to open to to become partially recollapsed in the direction opposite to the direction in which it was collapsed while it was disposed in said stack; and forwarding means comprising two intermittently cooperating rollers, one of which is coaxial with said carrier and is engaged by said partially recollapsed carton for completing the recollapse thereof, the other of said forwarding rollers being driven in timed relationship with respect to said carrier member and having a portion thereof cut away to clear said suction tool, the remainder of said other roller being arranged to engage said recollapsed carton at said second position.

9. A device according to claim 8 further comprising reopening means disposed to receive moving recollapsed cartons from said forwarding means, said reopening means comprising continuously operative means for receiving and erecting said moving recollapsed cartons prior to further onward conveyance thereof.

10. A device according to claim 8, in which said suction face leg of said crank shaped tool is independently rotatable about its own longitudinal axis, said device further comprising resilient means yieldingly acting on said suction face leg and urging said suction face toward a rotational position for engagement with said foremost carton at said first position.

11. A device of the class described, comprising in combination: supply means for feeding flat collapsed cartons arranged in a stack; a continuously rotating carrier member having its axis of rotation parallel to the planes of said cartons; a fixed externally toothed gear coaxial with said carrier member; a planetary gear carried by said carrier member and meshing with said fixed gear; a hollow suction tool coaxial with said planetary gear and connected thereto for rotation therewith, said suction tool having an active suction face portion extending parallel to said carrier axis and in alignment with the pitch circle of said planetary gear, said suction face being arranged to become momentarily linearly stationary at a first position adjacent to an edge portion of the foremost carton in said stack for engagement therewith and to travel continuously in an epicycloidal path from said first position to a second position at which said suction face has a considerable linear component in its velocity, said tool having suction continuously applied thereto during its travel from said first position to said second position for conveying said engaged carton therebetween; and forwarding means comprising two intermittently cooperating rollers which cause said engaged carton to be completely recollapsed in the direction opposite to the direction in which it was collapsed while it was disposed in said stack, one of said rollers being driven in timed relationship with respect to said carrier member and having at least a portion thereof cut away to clear said suction tool, the remainder of said one roller being arranged to press said engaged carton against said other roller when said engaged carton reaches said second position.

12. A device according to claim 11 in which said stack of cartons extends across the path of travel of said suction tool around said fixed gear and wherein said suction tool is axially slidably connected to said planetary gear, said device further comprising cam means acting on said tool for moving said tool axially to clear said stack at that portion of said path where said stack extends thereacross.

13. A device of the class described, comprising in combination: supply means for feeding flat collapsed cartons arranged in a stack; a continuously rotating carrier member having an axis of rotation parallel to the planes of said cartons in said stack; a fixed internally toothed ring gear coaxial with said carrier member; a planetary gear carried by said carrier member and meshing with said ring gear, said planetary gear having one-half the number of teeth provided in said ring gear; a suction tool having a first portion coaxial with said planetary gear and connected thereto for rotation therewith and a second portion located radially outwardly from the center of said planetary gear, said second portion having an active suction face extending parallel to said carrier member axis and disposed radially outwardly of the pitch circle of said planetary gear to travel in an elliptical path from a first position at one end of the major axis of said ellipse to a second position at the opposite end of said major axis, said suction face being arranged to engage an edge portion of the foremost carton in said stack substantially at said first position where the linear component of its velocity is a minimum, said suction tool having suction continuously applied thereto during its travel from said first position to said second position for conveying said engaged carton therebetween; guide means cooperating with the edge portion of said carton remote from said suction face during the first portion of its travel from said first position to said second position for opening said engaged carton and partially recollapsing it in the direction opposite to the direction in which it was collapsed while disposed in said stack; a forwarding roller having a stationary axis spaced from and parallel to said axis of said carrier member; and a hollow segmented cylindrical member carried coaxially by said carrier member for rotation therewith, said cylindrical member comprising two segments disposed outside of the path of travel of said suction face and said engaged carton, each of said segments being arranged to press one of said partially recollapsed cartons against said forwarding roller for completing the recollapse thereof and conveying said carton onwardly past said second position in completely recollapsed condition.

14. A device according to claim 13, further comprising a second ring gear fixedly axially spaced from said first-named ring gear coaxially therewith, said second ring gear being similar to said first-named ring gear;

a second planetary gear meshing with said second ring gear; crank means fixed to said carrier member and revolubly supporting said second planetary gear with its rotational axis diametrically opposite the rotational axis of said first-named planetary gear; and a second suction tool similar to said first-named suction tool, said second suction tool being associated with said second planetary gear and having the suction face thereof extending longitudinally in the direction opposite to that of said first-named suction tool.

15. In combination with pickup means for individually successively engaging flat collapsed cartons arranged in a stack and forwarding means for receiving and forwarding each of said cartons onwardly from said pickup means, said pickup means and said forwarding means together comprising means for recollapsing each carton in the direction opposite to the direction in which it was collapsed in said stack, the provision of reopening means for said recollapsed cartons, said reopening means comprising: two continuously rotating members having spaced parallel axes of rotation; continuously operating conveying means comprising spaced pocket-like feeding receptacles; a plurality of link means each interconnecting two pivot means each carried by a different one of said rotating members, each of said pivot means being disposed on the one of said rotating member by which it is carried at the same radial distance from its rotational axis, said pivot means being regularly arranged therearound for maintaining all of said link means continuously directed parallel to the plane of said spaced rotational axes; at least one gripping means carried by said link means and disposed to receive each recollapsed carton handled by said forwarding means, said gripping means being carried into and retracted from the path of travel of said conveying means once during each revolution of said rotating members, said gripping means being disposed to engage a recollapsed carton delivered by said forwarding means and to reopen said carton while introducing said carton in one of said pocket-like feeding receptacles, said gripping means moving at approximately the same speed as said receptacle during said introduction of said carton therein.

16. The combination according to claim 15, in which the path of travel of said conveying means is generally rectilinear in that portion thereof where said gripping means is carried into said path, said pocket-like receptacles each including a forward wall, and wherein said gripping means includes a member of L-shaped cross-sectional configuration, one leg of said L being continuously maintained substantially parallel to said forward walls by said link means throughout the rotations of said continuously rotating members, said reopening of said carton taking place while one side thereof is positioned for engagement with said one leg of L-shaped member and an opposite side thereof is positioned for engagement with one of said forward walls, the side engaged by said L-shaped member being accelerated as said one leg thereof progressively enters said rectilinear path of travel, the spacing between said one leg and said forward wall being substantially equal to and slightly greater than the distance between said opposite sides of said carton when said carton is fully reopened, said reopening being completed at the time when the axes of the pivots interconnected by the link means which maintains said one leg of said L-shaped member parallel to said forward walls are substantially coplanar with the axes of said continuously rotating members, the velocity of said L-shaped member at said time being substantially vectorially equal to the velocity of said conveying means.

References Cited in the file of this patent

UNITED STATES PATENTS

| | | |
|---|---|---|
| 2,016,814 | Ferguson | Oct. 8, 1935 |
| 2,241,817 | Howard | May 13, 1941 |
| 2,573,324 | Ferguson | Oct. 30, 1951 |
| 2,611,299 | Rose et al. | Sept. 23, 1952 |

FOREIGN PATENTS

| | | |
|---|---|---|
| 390,443 | Germany | Feb. 19, 1924 |